(12) United States Patent
Chartier et al.

(10) Patent No.: US 7,391,309 B2
(45) Date of Patent: Jun. 24, 2008

(54) BRAKING MONITORING SYSTEM

(75) Inventors: Albert Chartier, Mascouche (CA); Gaetan Jette, Ste-Therese (CA)

(73) Assignee: Securite GMR Safety, Terrebonne, Quebec (CA)

( * ) Notice: Subject to any disclaimer, the term of this patent is extended or adjusted under 35 U.S.C. 154(b) by 316 days.

(21) Appl. No.: 10/917,435

(22) Filed: Aug. 13, 2004

(65) Prior Publication Data

US 2005/0035853 A1      Feb. 17, 2005

Related U.S. Application Data

(60) Provisional application No. 60/495,469, filed on Aug. 15, 2003.

(51) Int. Cl.
*B60Q 1/00*      (2006.01)

(52) U.S. Cl. .................. 340/454; 340/452; 340/467; 340/474

(58) Field of Classification Search .......... 340/452, 340/454, 467, 474
See application file for complete search history.

(56) References Cited

U.S. PATENT DOCUMENTS

| 4,937,554 | A   |   | 6/1990  | Herman ................... 340/453 |
| 5,339,069 | A   | * | 8/1994  | Penner et al. ............. 340/464 |
| 5,433,296 | A   | * | 7/1995  | Webberley ............ 188/1.11 L |
| 5,939,978 | A   | * | 8/1999  | Kyrtsos ................... 340/464 |
| 6,112,859 | A   |   | 9/2000  | Shuck et al. ............. 188/1.11 |
| 6,470,240 | B1  | * | 10/2002 | Haynes et al. ............... 701/1 |

* cited by examiner

*Primary Examiner*—George A Bugg
*Assistant Examiner*—Travis R Hunnings
(74) *Attorney, Agent, or Firm*—Mila Shvartsman

(57) ABSTRACT

A monitoring system for driver's braking habits comprising a sensor connected to brakes of a vehicle provided to sense and evaluate the following levels of pressure being applied to the brakes by a driver: normal pressure, above normal pressure and an excessive pressure level. The sensor is adapted to activate a warning signal element connected to the sensor and is provided to warn the driver when the pressure level exceeds the above normal pressure level and the excessive pressure level which facilitates correction of bad driving habits of the driver and development of preventive driving techniques. The sensor comprises a first sensor adapted to sense and evaluate the above normal pressure level, and a second sensor adapted to sense and evaluate the excessive pressure level.

11 Claims, 4 Drawing Sheets

An assembly of the braking monitoring system

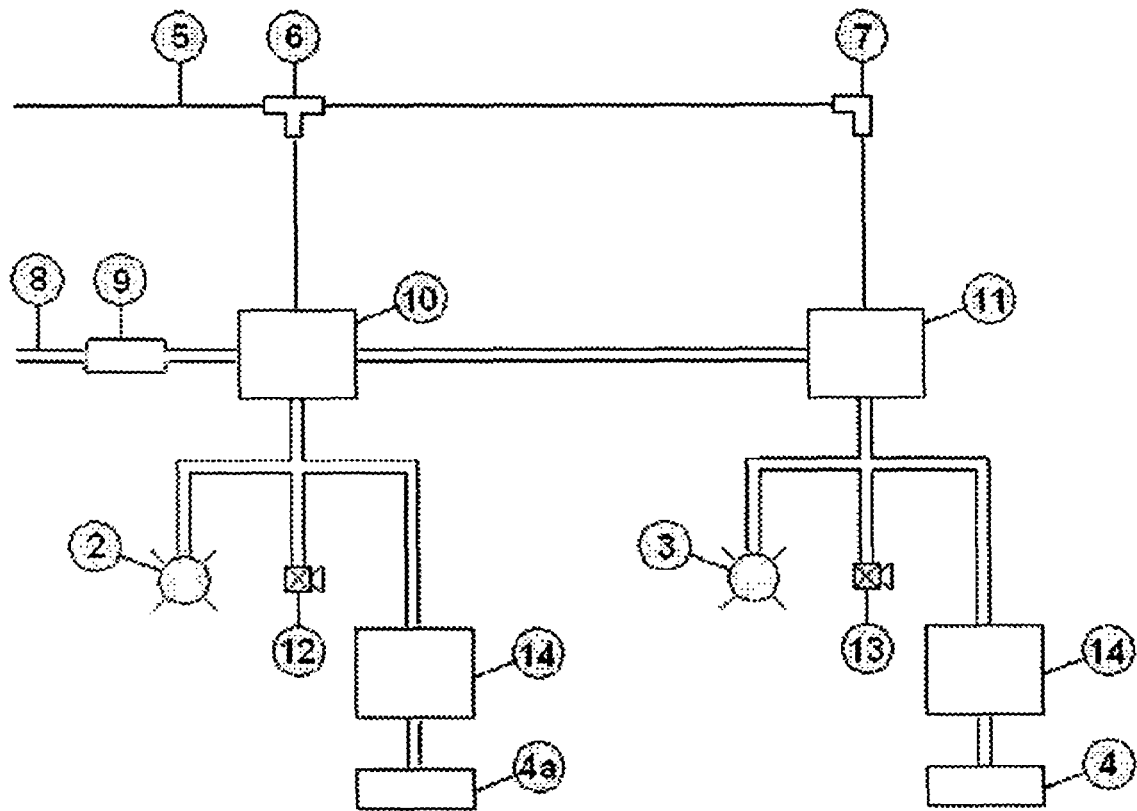
Figure 1 : Bloc-diagram schematic of a braking monitoring system

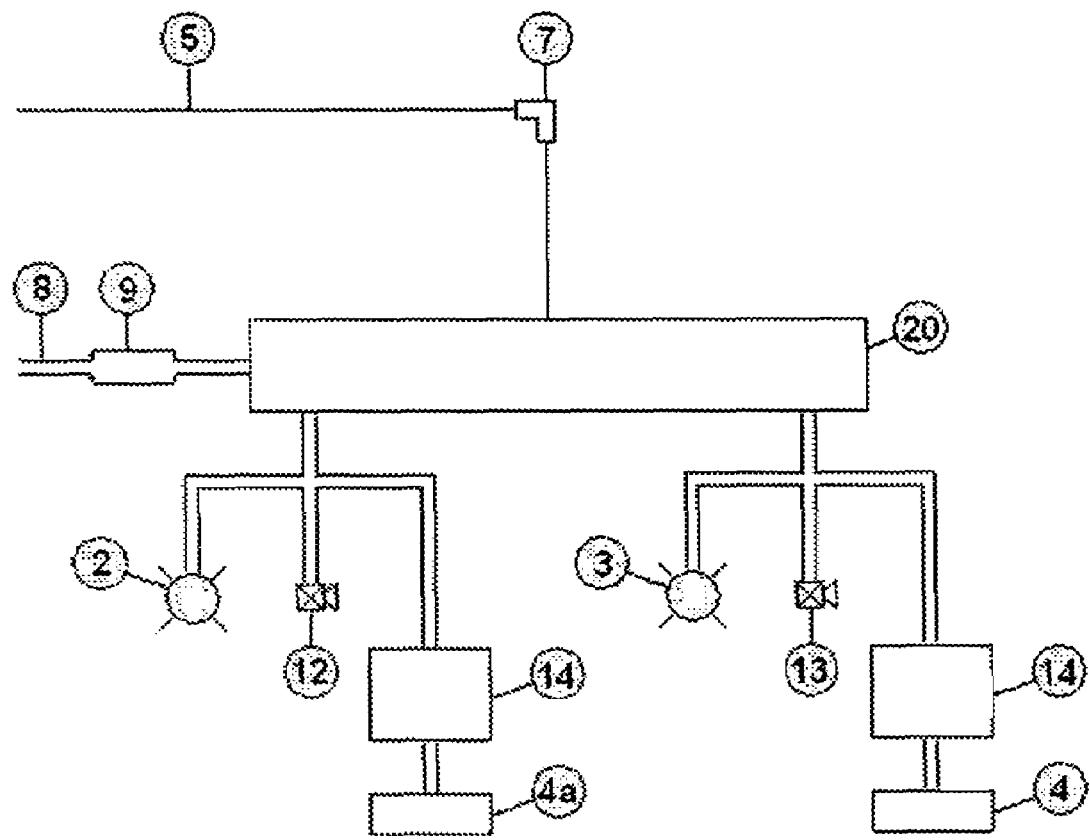
Fgure 2: Bloc-diagram schematic of the monitoring system using a double pole pressure switch

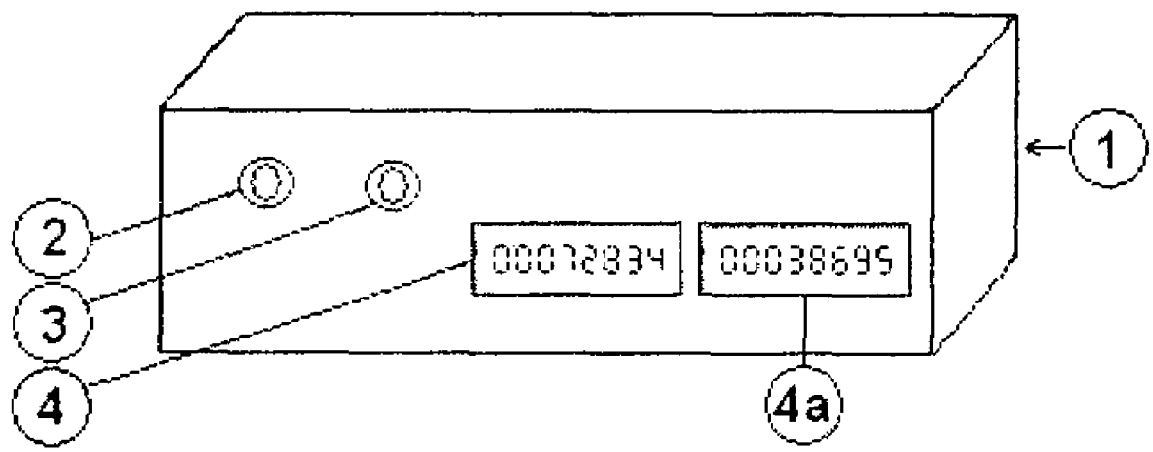
Figure 3: An assembly of the braking monitoring system

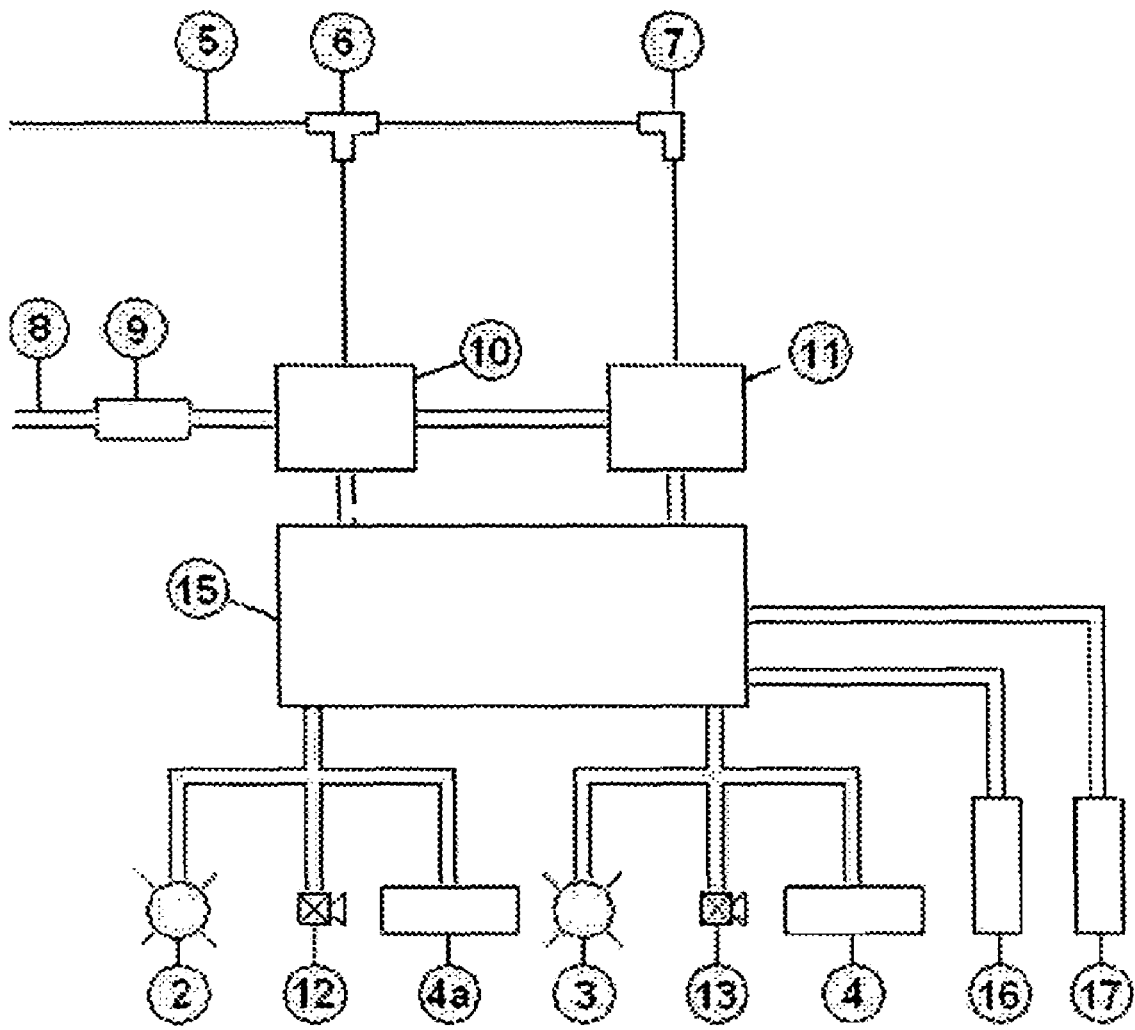
Figure 4: A variation of fig.1 which include an electronic control unit ically, speed and bad driving by sober drivers are the main
BRAKING MONITORING SYSTEM This application is based on the Provisional Ser. No. 60/495,469 filed on Aug. 15, 2003.

BACKGROUND OF THE INVENTION

Thousands of vehicles are on the road every day, and most reported accidents involve cars, trucks, bikes and even pedestrians. Alcohol is sometimes the cause, but according to statistics, speed and bad driving by sober drivers are the main factors of road accidents. Bad driving happens when vehicles are going too fast, tail-gaiting, and drivers slam on the brakes.

Road safety is a major concern for government, companies and the general population. Often drivers acquire bad driving habits that turn out to be dangerous. These habits are amplified in magnitude when these people drive heavy trucks or buses. They eventually forget basic principles they learned in preventive driving, they go too fast and do not use any defensive techniques. This often translates in over-usage of the vehicle's brakes.

For large trucks, a variety of systems are available that provide additional information on the driver's performance. Whenever this information is downloaded, it provides data on speed, acceleration, deceleration, usage of brakes, shifting of gears, engine temperature, time that engine is left running on idle and other situations. The computer readings can advise drivers of faulty driving habits and even the exact location where it happened. The company can get a reading on a driver's habits over the past few hours, days or weeks. Correction of these driving habits and training can be the solution.

However, these monitoring computers are very expensive and thus inaccessible for all but the richest companies. Besides, companies that use this technology are sometimes overwhelmed by the amount of information being recorded, thus making the information useless and unmanageable. Most important of all, these systems do not offer much assistance to promote preventive driving because they provide such information after the fact.

OBJECT OF THE INVENTION

The present invention is a device that will advise the driver of his error at the precise moment of such error; he will get direct feedback that the brakes are being applied using pressure above normal limits, and will be able to adjust to the hazardous situation immediately as it happens. Drivers will finally have a tool to correct bad driving habits and become preventive drivers.

Companies will have a tool that records a truck driver's profile and helps determine how he uses the brakes while driving. Drivers will have a tool to correct their techniques and change their view towards preventive driving. Eventually, drivers will acquire good driving habits, such as:

driving at speeds that allow enough time to respond to surrounding situations and have a clear vision of what is in front, on the side and even behind his vehicle. If the driver follows these simple rules, he will be able to react without the need to apply abnormal pressure on brakes;

keeping a safe distance between his vehicle and cars ahead of him to allow braking using a pressure that does not exceed normal level;

this device can even allow the truck driver to know if the brakes are still in good condition.

When departing, the driver can check the level of pressure required to get satisfactory braking to see if the brakes are in bad shape and need adjustment. On the road, if it is necessary to apply excessive pressure to get satisfactory braking, this may be an indication that the brakes are faulty. If this happens after having driven on a long distance, it may be a sign that the brakes need to be adjusted.

If abnormal pressure is suddenly necessary to stop the truck while driving, the driver will know that he should immediately verify it. Overheating of the brakes may be a result from abusive usage and it will be necessary to allow the brakes to cool off. If the problem persists, the brakes should be checked immediately.

The device of the present invention allows a truck driver to know the level of air pressure applied when braking. It will also teach him better use of brakes and prevent their excessive use. Visual and audible signals may also indicate that the brakes are not properly adjusted on the truck or on semi-trailer, which can prevent accidents.

Braking monitoring system of the present invention can be utilized on air brake systems, mechanical brakes found on motorcycles and farm equipment, non-assisted hydraulic brakes, electric brakes, assisted hydraulic brakes and air or hydraulic systems.

SUMMARY OF THE INVENTION

Braking monitoring system of the present invention is designed to measure a level of pressure applied to brakes that is categorized into the following types:

Normal pressure level;

Above normal pressure level, and

Excessive pressure level.

Device of the present invention will advise the driver before the fault wherein he will get a direct feedback from sensors that brakes are being applied using pressure that is above normal level and at excessive level. Driver will be notified when this happens by getting signals from light or audible elements allowing him to adjust brakes and to prevent hazardous situations.

Information about pressure applied on the brakes is measured by different types of sensors depending on type of brake systems used. Pressure switch is used for hydraulic or air systems. A tension meter is used for mechanical systems. Finally, amp or volt meters are used for electric brake systems.

This simple and cost effective system of the present invention will be a tremendous tool for both transport and insurance companies. It can help save lives, prevent injuries and numerous accidents by improving the driver's habits; if there are fewer accidents, there is more profit, lower insurance premiums and fewer claims.

BRIEF DESCRIPTION OF DRAWING

Different embodiments of the present invention will now be described with reference to the accompanying drawings, including:

FIG. 1 is a block-diagram of braking monitoring system of the present invention for air brakes using two pressure sensors FIG. 2 is a block-diagram of braking monitoring system for air brakes using one pressure sensor.

FIG. 3 shows a perspective view of the assembly of the braking monitoring system.

FIG. 4 is a block-diagram of braking monitoring system for air brakes provided with an electronic control unit.

DETAILED DESCRIPTION OF THE PREFERRED EMBODIMENT

Referring now to drawings, FIG. 1 shows a block-diagram of the first embodiment of the brake monitoring system according to the present invention comprising sensor means including sensor 10 that is a low-pressure switch which is activated when above normal pressure is applied to brakes, and sensor 11 which is high-pressure switch which is activated when excessive pressure is applied to brakes. Sensors 10 and 11 are connected to an air hose 5 from the braking system (not shown) by means of T-fitting link 6 and 90° link 7, and to an electric wire 8 from vehicle power supply provided with a fuse 9 to protect the electrical system from overload or short circuit. Sensor 10 is also connected to a signal means, such as light indicator 2 and low volume buzzer 12 provided to signal when pressure is above normal level. Sensor 11 is connected to a light indicator 3 and a high volume buzzer 13 provided to warn the driver when an excessive pressure is applied to brakes. Each of sensors 10 and 11 are provided with a debouncing circuit 14 and event counters 4 and 4a respectfully.

It must be emphasized that definition of normal, above normal and excessive pressure can vary from one brake manufacturer to another, and thus cannot be defined. The most common parameters are 1-20 psi for normal pressure, 20-30 psi for above normal and all pressure above 30 psi is excessive pressure. However, these parameters can be set by the end user for their own purposes, and thus the above parameters are given as an illustration of possible settings. Other settings will be covered by the scope of the invention.

When the driver applies the brakes, air from air brake supply is sent via hose 5 to sensors 10 and 11 of the brake monitoring system sensor, which evaluate the pressure level applied to brakes. If the driver applies above normal pressure level, sensor 10 is triggered and latched while the pressure is above normal level. As soon as sensor 10 is latched, light indicator 2 and warning buzzer 12 are both turned on. Counter 4a will monitor the number of times above normal pressure level was applied.

If more pressure is applied on the truck's braking system, the system goes into a condition called 'excessive pressure'. As soon as the system reaches this condition, sensor 11 is triggered and latched. At the same time, light indicator 3 and warning buzzer 13 will be activated. Event counter 4 will monitor the number of time the excessive pressure level was applied.

Each counter 4 and 4a are protected against rebounds that can be produced by sensor's electrical contacts by means of the pressure switch debouncing circuits 14. These circuits 14 are provided to prevent counters 4 and 4a from counting more than one event. They mask the mechanical rebounds made by switches 10 and 11 to event counters 4 and 4a. Those circuits are used as protection due to the fact that when contacts of each switch are closed, contact never locks instantly and has a period of 20 microseconds or less before contact locks perfectly. During this short period of time, the contact will rebound, passing from "closed" state to "open" state. Industrial event counters are very sensitive to these rebounds and react each time.

FIG. 2 is a first modification of the embodiment shown on FIG. 1, except that sensors 10 and 11 are replaced by one double pole pressure switch 20 having one pole A set as a low-pressure switch and the other pole B set as a high-pressure switch.

FIG. 3 shows an assembly of braking monitoring system including lights 2 and 3, event counters displays 4 and 4a and enclosure 1.

FIG. 4 shows a second modification of embodiment of FIG. 1 additionally comprising electronic control unit 15 placed between sensors 10 and 11 and signal means or light indicators 2 and 3 and buzzers 12 and 13. Electronic control unit 15 is provided to monitor and record the information to be downloaded from communication port 16 connected to unit 15. Recorded information may be sent to a remote station by means of a satellite output 17 connected to unit 15. Similar to system of FIG. 1, air pressure in the air line or hose 5 of brakes will be sent to sensors 10 and 11. Electronic control unit 15 will activate light indicators 2 and 3 and buzzers 12 and 13. Event counters 4 and 4a will monitor the number of times pressure will go above normal or excessive levels. It should be noted that embodiment of FIG. 4 does not have debouncing circuits 14 due to the presence of electronic control unit 15.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

The invention claimed is:

1. Monitoring system for a driver's braking habits comprising:
   a sensor means connected to a main line of a braking system of a vehicle,
      said sensor means are provided to sense and evaluate the driver's braking habits characterized by the following levels of pressure being applied to said brakes by said river:
      a normal pressure level;
      an above normal pressure level; and
      an excessive pressure level;
   said sensor means are adapted to activate a warning signal means connected to said sensor means, wherein said warning signal means are provided to warn said driver only when the pressure level exceeds the above normal pressure level and the excessive pressure level, thus facilitating correction of bad driving habits of said driver and development of preventive driving techniques.

2. Monitoring system according to claim 1, wherein said sensor means comprise a first sensor means, said first sensor means being adapted to sense and evaluate the above normal pressure level; and a second sensor means, said second sensor means being adapted to sense and evaluate the excessive pressure level.

3. Monitoring system according to claim 2, wherein each of said first and said second sensor means are connected to a respective first and second warning signal means.

4. Monitoring system according to claim 3, wherein said first and said second warning signal means are light signals.

5. Monitoring system according to claim 3, wherein said first and said second warning signal means are buzzer signals.

6. Monitoring system according to claim 2, wherein said first and said second sensor means are pressure sensors.

7. Monitoring system according to claim 1, wherein said system further comprises a first and a second event counter, said first and said second event counters are connected to said sensor means and are adapted to monitor and count the number of times when the above normal and the excessive pressure levels were applied to said brakes.

8. Monitoring system according to claim 7, wherein each of said first and said second event counters are provided with debouncing elements, wherein said debouncing elements are provided to prevent said counters from counting more than one event at a time.

9. Monitoring system according to claim 1, wherein said system further comprises an electronic control unit, said electronic control unit being connected between said sensor means and said warning signal means, wherein said electronic control unit is provided to monitor said system and to record all information.

10. Monitoring system according to claim 9, wherein said system further comprises a communication port, said communication port is connected to said electronic control unit and provided to download all information recorded into said electronic control unit.

11. Monitoring system according to claim 10, wherein said system further comprises a satellite port, said satellite port being connected to said electronic control unit and is adapted to transmit all information recorded in said electronic control unit to a remote location.

* * * * *